(12) United States Patent
Schafer et al.

(10) Patent No.: US 9,677,619 B2
(45) Date of Patent: Jun. 13, 2017

(54) PRE-MOUNTING OF A GAP-OPTIMIZED CLIP RING BETWEEN INNER RINGS OF AN ANTI-FRICTION BEARING

(71) Applicant: Schaeffler Technologies AG & Co. KG, Herzogenaurach (DE)

(72) Inventors: Marc-Andre Schafer, Uchtelhausen (DE); Martin Sturzenberger, Euerbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/914,409

(22) PCT Filed: Sep. 15, 2014

(86) PCT No.: PCT/DE2014/200476
§ 371 (c)(1),
(2) Date: Feb. 25, 2016

(87) PCT Pub. No.: WO2015/055190
PCT Pub. Date: Apr. 23, 2015

(65) Prior Publication Data
US 2016/0201725 A1 Jul. 14, 2016

(30) Foreign Application Priority Data
Oct. 14, 2013 (DE) ........................ 10 2013 220 701

(51) Int. Cl.
*F16C 33/36* (2006.01)
*F16C 33/60* (2006.01)
(Continued)

(52) U.S. Cl.
CPC ............ *F16C 35/061* (2013.01); *F16C 33/60* (2013.01); *F16C 43/04* (2013.01); *F16C 19/386* (2013.01); *F16C 2226/74* (2013.01)

(58) Field of Classification Search
CPC .... F16C 19/385; F16C 19/386; F16C 19/388; F16C 33/60; F16C 35/061; F16C 43/04; F16C 2226/74
See application file for complete search history.

(56) References Cited

U.S. PATENT DOCUMENTS

| 5,136,777 A * | 8/1992 | Brockmuller | .......... B21K 25/00 |
| | | | 29/725 |
| 2009/0190874 A1* | 7/2009 | Burner | .................. F16C 19/386 |
| | | | 384/480 |

FOREIGN PATENT DOCUMENTS

| DE | 9017861 | 5/1992 |
| DE | 19955390 | 5/2001 |

(Continued)

*Primary Examiner* — Phillip A Johnson
(74) *Attorney, Agent, or Firm* — Volpe and Koenig, P.C.

(57) ABSTRACT

An anti-friction bearing unit (1), configured at least as a two-row anti-friction bearing with at least one outer ring (4a, 4b) and at least two inner rings (5a, 5b), between which rolling bodies (6a, 6b) are guided on raceways of the bearing rings (4a, 4b; 5a, 5b). A clip ring (14) that engages into annular grooves (12a, 12b) of axially extended sections (8a, 8b) of the adjacent inner rings (5a, 5b) is provided for securing an axial position of the inner rings (5a, 5b). The radially pre-stressed clip ring (14) of U-shaped design is arranged in a non-positive manner on an intermediate step (13) of the inner ring (5a) in a pre-mounting position and can be pushed from there into an end position. In matching positions of the flanks (15a, 15b) of the clip ring (14) and corresponding annular grooves (12a, 12b) of the extended sections (8a, 8b), the clip ring (14) latches in a positively locking manner and brings about an axial connection of both inner rings (5a, 5b).

10 Claims, 4 Drawing Sheets

(51) Int. Cl.
*F16C 43/04* (2006.01)
*F16C 35/06* (2006.01)
*F16C 19/38* (2006.01)

(56) References Cited

FOREIGN PATENT DOCUMENTS

| | | | |
|---|---|---|---|
| IT | EP 1033504 A2 * | 9/2000 | ............ F16C 19/386 |
| JP | 2004197790 A * | 7/2004 | |
| JP | 2008075832 | 4/2008 | |
| JP | 2008169957 | 7/2008 | |
| JP | 4262974 B2 * | 5/2009 | ............ F16C 19/386 |
| SE | DE 102005034717 A1 * | 2/2007 | .............. F16C 33/60 |
| WO | 9742425 | 11/1997 | |

\* cited by examiner

PRE-MOUNTING OF A GAP-OPTIMIZED CLIP RING BETWEEN INNER RINGS OF AN ANTI-FRICTION BEARING

BACKGROUND

The invention relates to an anti-friction bearing unit according to the features of the preamble. In addition, the invention relates to a method for the mounting of individual parts of the anti-friction bearing unit.

From DE 90 17 861 U1, a two-row tapered roller bearing in an O-arrangement is known that is assembled essentially from an outer bearing ring and an inner bearing ring and also from a number of tapered rollers rolling on raceways between the bearing rings in two rows one next to the other. The outer bearing ring here has a one-piece construction, while the inner bearing ring of the tapered roller bearing is divided in the axial direction and comprises two individual rings that are positioned with the installation of the bearing in machines or the like usually by means of an interference fit on a shaft relative to each other such that production-related tolerances from the production of the individual parts of the anti-friction bearing are compensated and a defined axial pre-stressing force is created between the tapered rollers of both rows, by which the bearing can roll essentially without play under load.

EP 0 897 486 A1 discloses an anti-friction bearing comprising two tapered roller bearings for a wheel bearing. To guarantee the tapered roller bearings are held together, the inner rings of both tapered roller bearings each form an axially projecting extension that is bordered on the outside in some sections by a securing ring. For fixing, the securing ring engages in grooves of the extensions of the inner rings.

SUMMARY

The object of the present invention is in creating a captive pre-mounting position for a gap-optimized, economically producible fixing element of bearing rings, which can furthermore be moved easily into a downstream end position.

This object is achieved by the anti-friction bearing and by a method having one or more features of the invention.

An anti-friction bearing unit is provided in which the inner rings each enclose extended, axially oriented sections on the facing sides. By the use of a U-shaped and radially pre-stressed clip ring also called a fixing element, the inner rings are held together. For this purpose, the clip ring borders radially stepped projections of the inner rings in the area of extended, axially oriented sections. In a pre-mounting position, the clip ring is arranged with a non-positive fit on an intermediate step of an inner ring. Starting from this position, the clip ring can be moved axially into an end position in which flanks of the clip ring automatically lock in corresponding annular grooves in the area of the extended, axially oriented sections of both inner rings.

By the use of the invention, a gap-optimized, economically realizable axial connection of adjacent inner rings and, in general, of bearing rings of a two-row anti-friction bearing, is ensured by a captive clip ring. In addition, the invention simplifies a downstream end mounting step that is performed with a simple tool without turning the clip ring. Advantageously, a defined, captive pre-mounting position of the clip ring is created by the concept according to the invention in that the clip ring is first placed on an intermediate step before the clip ring can be moved axially into the end position after a joining of the bearing rings. The clip ring and the bearing ring are matched to each other so that first a pre-mounting position of the clip ring on the bearing ring is created in which, during the installation of the bearing parts, the clip ring does not slip, but can be easily mounted and furthermore offers the advantage of a robust handling and a gap-optimized geometry.

For removal or maintenance of the anti-friction bearing unit, the invention simultaneously offers the advantage that the clip ring is allocated captively to a bearing ring, which simplifies the repair and can be performed reliably. In previously known solutions, the fixing element or the clip ring is inserted in an undefined way as a loose part, for example, into a hole, and this part can fall out during handling, which makes assembly or removal more difficult. For the bearing mounting, the fixing element or the clip ring must be taken out of the hole and inserted into the provided grooves of the bearing rings. This produces the problem, both during series production and also in mounting in the aftermarket (for example, in the workshop), that the clip ring can turn or fall out.

In comparison, according to the invention with the defined allocation or position determination of the clip ring, both the mounting and also removal can be improved and simplified, which also produces cost advantages.

In particular, the invention is provided in an O-arrangement for multiple-row tapered roller bearings being used as wheel bearings. The setup according to the invention is not limited to this arrangement, but could also be transferred, for example, to anti-friction bearings in an X-arrangement or also to multiple-row bearings in which multiple rings are to be connected. With the invention, existing anti-friction bearing units could be improved without significant extra costs. At the same time, advantages with respect to economics and a robust setup are also produced. The invention can also be transferred into existing constructions, wherein the degree of system integration increases and the error susceptibility can be reduced.

According to one preferred construction of the invention, a matching of the clip ring to the inner ring is provided in which, for the ends of the clip ring in the inserted state, in the pre-mounting position, an overlap between 1 to 20° is set. The free ends arranged in a spiral shape relative to each other are matched so that these lie axially in the same plane. This is achieved in that the clip ring is arranged in the pre-mounting position with a non-positive fit on an intermediate step of the inner ring and simultaneously contacts a contact surface of the inner ring shaped as a shoulder. This measure also has the effect in the handling case (e.g., in production) of providing a secure hold, wherein the clip ring can neither slip nor fall out.

The radially stepped projections are bounded laterally in the area of the extended, axially oriented sections of the inner rings for holding the clip ring. On one side by a contact surface of the first inner ring bounding the intermediate step and also be a shoulder connecting the annular groove of the second inner ring.

To achieve a stable installation position, the clip ring is supported in the pre-mounting position advantageously according to the invention with a contact angle $\alpha \geq 180°$ to $\geq 360°$ on the axial contact surface of the inner ring. Preferably, a contact angle $\alpha$ of 270° is provided. For realizing this contact angle, the diameter of the intermediate step is designed accordingly. At the same time, a correspondingly large axial contact surface should be provided for a press-in tool with which the clip ring is moved.

Another advantageous construction of the invention simplifies the mounting, the axial movement of the clip ring from the pre-mounting position into the end position. For this purpose, it is provided according to the invention to design the diameter of the projections of both inner rings stepped on the inside and bounded by end walls so that these project beyond the diameter of the intermediate step of an inner ring. Due to these diameter relationships, for an axial movement of the clip ring from the pre-mounting position into the end position, an automatic locking of the flanks of the clip ring in the associated annular grooves of the inner rings is simplified.

According to the invention, another structural design provides that the outer radii between the annular grooves and end walls of the inner rings exceed the inner radii of the clip ring. Alternatively, the radii could have the same size. For the outer radii, a maximum size of 0.3 mm is provided. As a supplemental design according to the invention for simplifying the installation, a geometry relationship between a clip ring width C and a groove spacing N of the annular grooves in the inner rings between 0.9 to 0.995 is provided.

As a measure for gap optimization of the clip ring, the invention also includes annular grooves that taper toward the side facing the end walls toward a groove base. This groove base shape creates, in connection with the clip ring engaging with a positive-fit connection in the annular grooves, a secure connection supporting the inner rings without play or gaps. In addition, it is possible to shape the corresponding flanks of the clip ring with opposing inclined profiles.

According to another preferred construction of the invention, it is provided that the intermediate step of the inner ring designed for the pre-mounting position of the clip ring has a longitudinal extent that exceeds a width of the clip ring. For supporting the transport-safe handling and for securing the clip ring, in particular, against undesired movement, it is possible to form holding grooves spaced apart in the intermediate step for holding the clip ring flanks. The holding grooves are created so that the clip ring can be detached without damage with the press-in process and this allows movement into the final position.

An alternative construction of the invention provides that the clip ring is supported with a non-positive fit in the pre-mounting position with a flank on the intermediate step and with the other flank on an end wall of the inner ring. By means of an end wall of the inner ring oriented inclined or at an angle in the direction of the annular groove, the position of the clip ring is supported in the pre-mounting position.

According to the invention, for mounting a clip ring between two inner rings of an anti-friction bearing unit of an anti-friction bearing, a method including the following steps is provided. First, the spiral-shaped, radially pressed together clip ring is pushed on the inside onto an intermediate step of an inner ring into a pre-mounting position in which the clip ring is supported axially on a contact surface. Then the two inner rings are joined together, wherein these are supported mutually by means of the extended sections. Then the clip ring is moved axially until the positions align, in which the flanks of the clip ring automatically lock in annular grooves of the projections stepped on the inside of both inner rings for locking the inner rings.

BRIEF DESCRIPTION OF THE DRAWINGS

Other details and improvements of the invention are given from the following descriptions of the figures in which embodiments of the invention are shown. The illustrated embodiments show examples how the arrangement according to the invention can be constructed. The invention is not limited to the illustrated embodiments. Shown are.

DETAILED DESCRIPTION OF THE PREFERRED EMBODIMENTS

Figure 1:
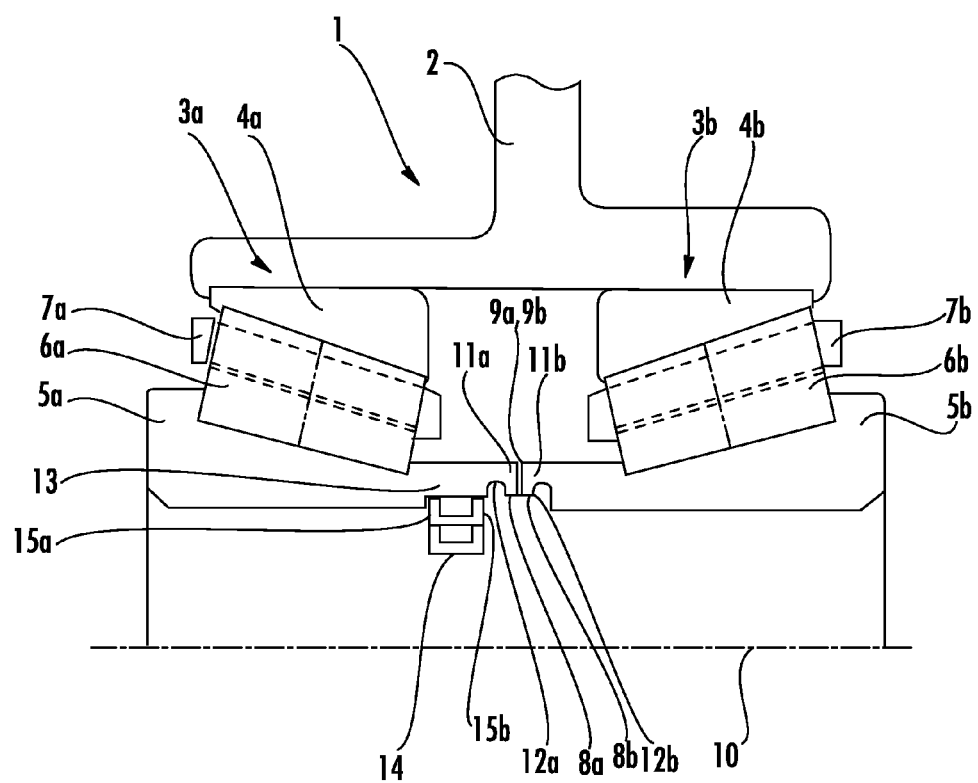
FIG. 1 in a half-section, an anti-friction bearing unit in connection with a clip ring according to the invention in the pre-mounted position, FIG. 2 to FIG. 4 the individual mounting steps for the clip ring before a pre-mounting position in an end position, FIG. 5 at an enlarged scale, structural details of inner rings and the associated clip ring, FIG. 6 the shape of radii on the annular grooves of the inner rings and the clip ring, FIG. 7 the clip ring that is positioned by means of holding grooves in the intermediate step, and FIG. 8 the clip ring in the pre-mounting position that is supported on the intermediate step and on an end wall of the inner ring.

FIG. 1 shows, in a half-section, an anti-friction bearing unit 1 that is inserted into a hub 2 of a wheel bearing of a vehicle (not shown). The anti-friction bearing unit 1 comprises two tapered roller bearings 3a, 3b each with an outer ring 4a, 4b, an inner ring 5a, 5b, and tapered rollers arranged in-between as rolling bodies 6a, 6b that are each guided in a rolling body cage 7a, 7b. The inner rings 5a, 5b each include, on the facing sides, axially extended sections 8a, 8b, whose end walls 9a, 9b are supported against each other. The extended sections 8a, 8b form stepped projections 11a, 11b on the side directed toward a longitudinal axis 10 of the anti-friction bearing unit 1, with circumferential annular grooves 12a, 12b being formed in these projections on the end side, adjacent to the end walls 9a, 9b. The stepped projection 11a also forms an intermediate step 13 on which a clip ring 14 is arranged in a pre-mounting position. The U-shaped clip ring 14 that is also called a fixing or securing element is designed for a gap-free contact of the inner rings 5a, 5b. For this purpose, the clip ring 14 can be moved from the pre-mounting position shown in FIG. 1 axially into an end position in which the spaced-apart flanks 15a, 15b of the clip ring 14 lock in the annular grooves 12a, 12b with a positive fit.

Figure 2:
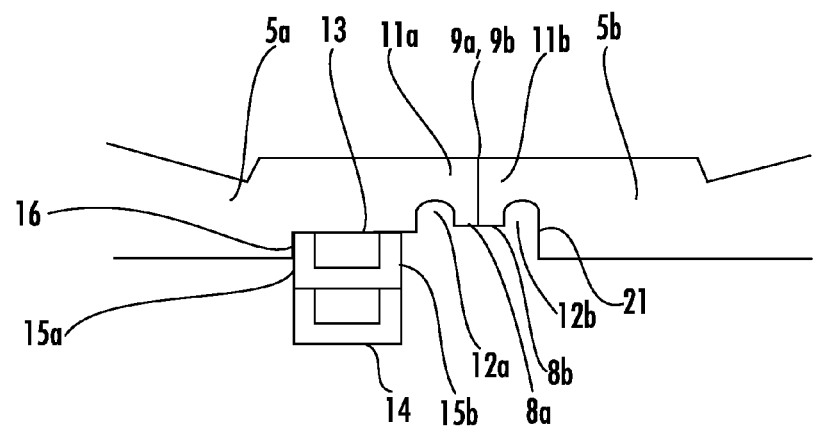
Figure 3:
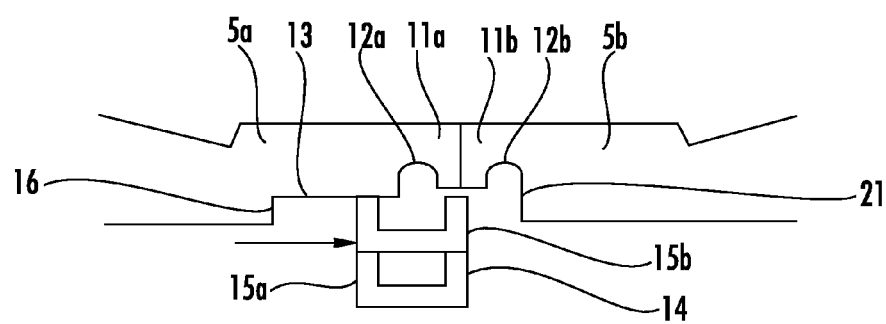
Figure 4:
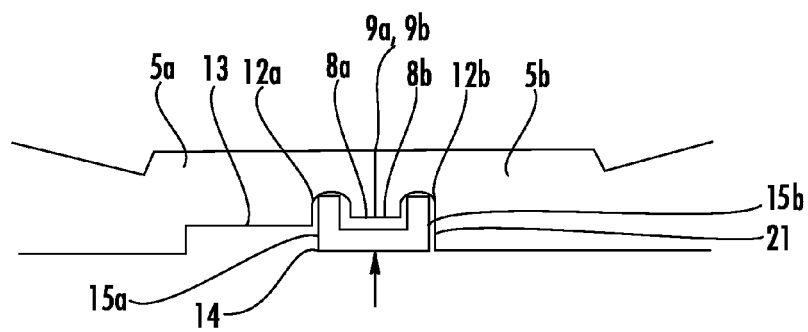

FIG. 2 to FIG. 4 show the individual mounting steps of the clip ring 14 from the pre-mounting position into an end position. According to FIG. 2, the radially pre-stressed clip ring 14 bordering the intermediate step 13 of the inner ring 5a with a non-positive fit is supported on a contact surface 16 of the inner ring 5a in the installed state, the pre-mounting position. Here, an overlap is set for the free, spiral-shaped ends of the clip ring 14 arranged in the same plane in a spiral shape relative to each other. By application of an axial force acting in the direction of the arrow, shown in FIG. 3, the clip ring 14 is moved in the direction of the inner ring 5b. For positional alignment of the flanks 15a, 15b with the annular grooves 12a, 12b and simultaneous support of the clip ring 14 on a shoulder 21 of the inner ring 5b, as shown in FIG. 4, the radial pre-stressing force and the increased diameter causes the clip ring 14 to spread open, wherein the flanks 15a, 15b automatically lock in the annular grooves 12a, 12b and simultaneously the overlapping of the ends of the clip ring 14 is eliminated and both ends are positioned with an optimized gap.

Figure 5:
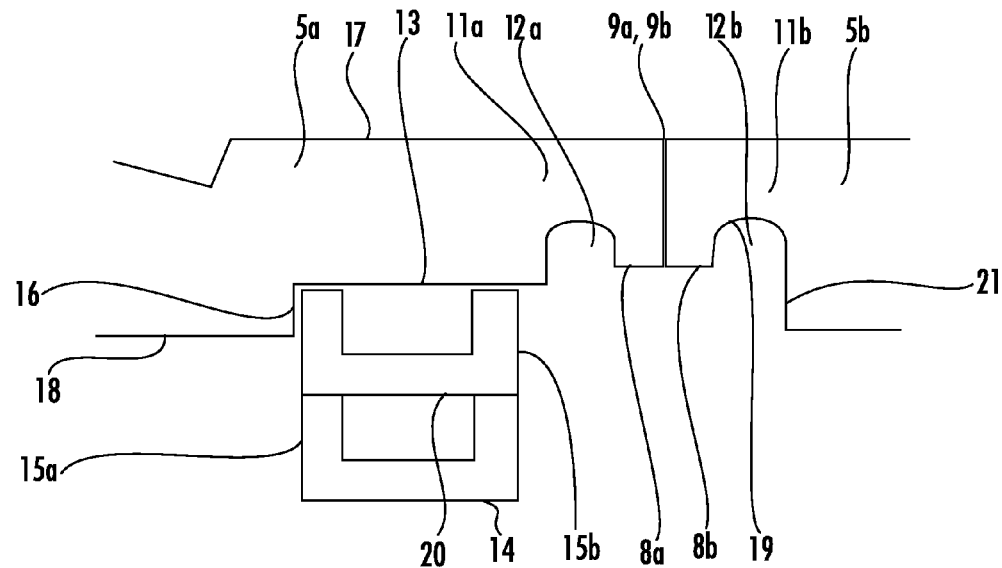

FIG. 5 shows structural details of the inner rings 5a, 5b and the associated clip ring 14. A preferred design provides that for the outer contour 17, the inner wall 18, and for the groove base 19 of the annular grooves 12, 12b of the inner rings 5a, 5b, matching diameters are provided. Between the inner wall 18 and the intermediate step 13 there is a diameter ratio between 0.88 to 0.995. Another diameter ratio of 0.7 to 0.98 is designed between the groove base 19 of the annular grooves 12a, 12b and the outer contour 17. A design that simplifies axial movement and consequently the mounting of the clip ring 14 provides that a diameter of the projections 11a, 11b of both inner rings 5a, 5b stepped on the inside and bounded by end walls 9a, 9b exceeds the diameter of the intermediate step 13. The width of the annular groove 12a, 12b corresponds to 100 to 110% of the flank width of the clip ring 14. The radial groove depth should be at least exactly as large, but preferably larger than the largest permissible edge reduction on the profile end. The diameter of the intermediate step 14 on the inner ring 5a should be smaller than the smallest diameter of the end mounting position, the diameter of the sections 8a, 8b on the inner rings 5a, 5b. A diameter ratio of 99% to 90% is desired. Furthermore, the following diameter ratios are provided: inner contour 20 of the clip ring 14<inner wall 18 of the inner rings 5a, 5b<intermediate step 13 of the inner ring 5a≤end wall 9a, 9b of the projections 11a, 11b<groove base 19 of the annular grooves 12, 12b<outer contour 17 of the inner rings 5a, 5b.

Figure 6:
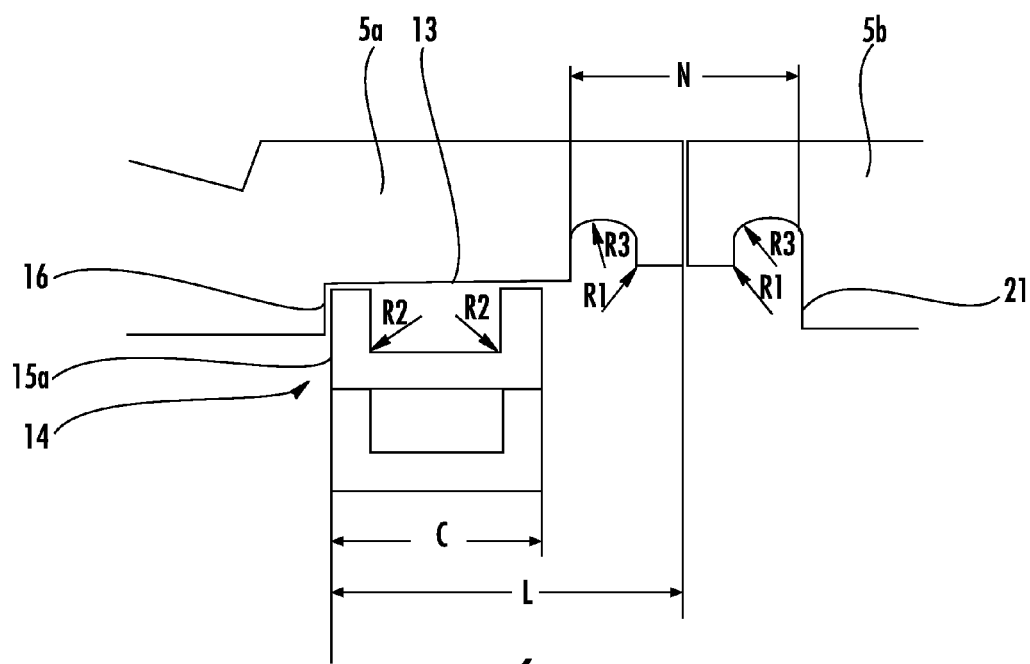

From FIG. 6, additional geometrical ratios between the inner rings 5a, 5b and the associated clip ring 14 are to be taken. Preferably, the outer radii $R_1$ between the annular grooves 12a, 12b and the associated end walls 9a, 9b of the inner rings 5a, 5b exceed the inner radii $R_2$ of the clip ring 14. Alternatively, the radii $R_1$, $R_2$ can have the same size. For the outer radii $R_1$, a dimension≤0.3 mm is provided. The annular grooves 12a, 12b enclose aligned inner radii $R_3$. For simplifying the mounting, a width ratio between a clip ring width C and a groove spacing N of the annular grooves 12a, 12b of the inner rings of between 0.9 to 0.995 is provided. A length L for the diameter step, a length dimension from the end wall 9a to the end of the intermediate step 13 can be designed by the relationship L=C to L=1.5(C+N/2).

Figure 7:
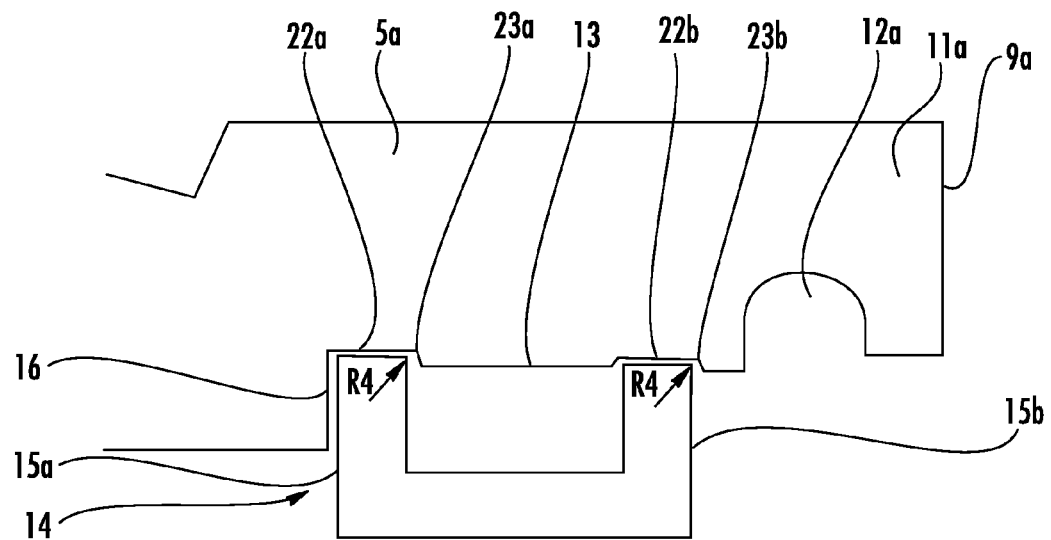
Figure 8:
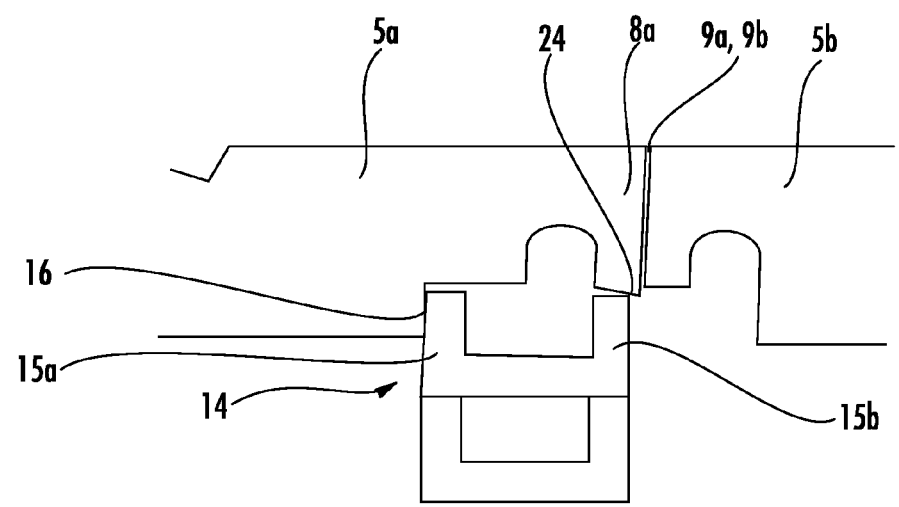

FIG. 7 and FIG. 8 show measures with which the clip ring 14 can be secured in the pre-mounting position, for example, against falling out unintentionally. For this purpose, according to FIG. 7 the intermediate step 13 has two axially spaced apart holding grooves 22a, 22b for holding the flanks 15a, 15b of the clip ring 14. The holding grooves 22a, 22b with a low depth are created so that the clip ring 14 can be detached without damage with a press-in tool (not shown) and it is possible for it to be moved into the end position. At least in the direction of the annular groove 12a, the holding grooves 22a, 22b have rounded transitions 23a, 23b that interact with radii $R_4$ of the clip ring 14. According to FIG. 8, the clip ring 14 is supported with a non-positive fit in the pre-mounting position with a flank 15a on the intermediate step 13 and with the other flank 15b on the end wall 9a of the inner ring 5a. Here, the section 8a of the end wall 9a forms a bevel 24 running at an angle in the direction of the annular groove 12a as an outer contour that exerts a supporting force on the clip ring 14, in order to hold this ring in the pre-mounting position.

LIST OF REFERENCE NUMBERS

1 Anti-friction bearing unit
2 Hub
3a,3b Tapered roller bearing
4a,4b Outer ring
5a,5b Inner ring
6a,6b Roller body
7a,7b Roller body cage
8a,8b Sections
9a,9b End wall
10 Longitudinal axis
11a,11b Projection
12a,12b Annular groove
13 Intermediate step
14 Clip ring
15a,15b Flank
16 Stop surface
17 Outer contour
18 Inner wall
19 Groove base
17 Inner contour
21 Shoulder
22a,22b Holding groove
23a,23b Transition
24 Bevel
C Clip ring width
L Length of diameter step
N Groove distance
$R_1$ Radius
$R_2$ Radius
$R_3$ Radius
$R_4$ Radius
α Contact angle

The invention claimed is:

1. An anti-friction bearing unit constructed at least as a multiple-row anti-friction bearing, comprising at least one outer ring and at least two inner rings, rolling bodies guided between the at least one outer ring and the at least two inner rings on raceways of the bearing rings the inner rings including annular grooves, a fixing element engageable in the annular grooves of the inner rings, the inner rings enclose axially extended sections on facing sides thereof, and the fixing element comprises a U-shaped and radially pre-stressed clip ring configured to hold the inner rings together and border projections of the inner rings stepped on an inside, and the clip ring is arranged in a pre-mounting position with a non-positive fit on an intermediate step of a first one of the inner rings and is movable from the pre-mounting position into an end position in which flanks of the clip ring automatically lock in corresponding ones of the annular grooves that are located on the extended sections for the axial connection of the inner rings.

2. The anti-friction bearing unit according to claim 1, wherein in a pre-mounting position free ends of the clip rings are arranged in a spiral shape, which sets an overlap between 1 to 20° axially in an aligned plane of the clip ring bordering the intermediate step of the inner ring.

3. The anti-friction bearing unit according to claim 1, wherein the intermediate step of the first inner ring is bounded by an axial contact surface and the annular groove of the second one of the inner rings is bounded by a shoulder.

4. The anti-friction bearing unit according to claim 1, wherein a diameter of the intermediate step of the first inner ring is selected so that the clip ring contacts the contact surface of the inner ring with a contact angle α between ≥180° to ≤360°.

5. The anti-friction bearing unit according to claim 1, wherein a diameter of the projections of the inner rings stepped on the inside and bounded by end walls exceeds a diameter of the intermediate step of the first inner ring.

6. The anti-friction bearing unit according to claim 1, wherein outer radii (R1) between the annular grooves and end walls of the inner rings exceed inner radii (R2) of the clip ring.

7. The anti-friction bearing unit according to claim 1, wherein a geometrical ratio between a clip ring width C and a groove spacing N of the annular grooves in the inner rings is between 0.9 to 0.995.

8. The anti-friction bearing unit according to claim 1, wherein the intermediate step of the first inner ring exceeds a width of the clip ring and the clip ring engages in the pre-mounting position with a positive fit in holding grooves of the intermediate step.

9. The anti-bearing bearing unit according to claim 1, wherein the clip ring is supported with a non-positive fit in the pre-mounting position with one flank on the intermediate step and with the other flank on a bevel of the axially extended section of the first inner ring.

10. A method for mounting the clip ring between the two inner rings of the anti-friction bearing unit of the anti-friction bearing according to claim 1 comprising:
   pushing the clip ring which is spiral-shaped, radially pressed-together, on the inside on the intermediate step of the first inner ring into the pre-mounting position of contact on an axial contact surface,
   joining the two inner rings which are supported together by the extended sections,
   moving the clip ring up to positional alignment in which flanks of the clip ring automatically lock in the annular grooves of the projections of the inner rings stepped on an inside for a positive-fit, axial connection of the inner rings.

\* \* \* \* \*